United States Patent [19]
Groenenboom

[11] Patent Number: 5,116,761
[45] Date of Patent: May 26, 1992

[54] APPARATUS FOR PREPARING COMPOST FROM MANURE BY FERMENTATION

[75] Inventor: Gerrit Groenenboom, Biddinghuizen, Netherlands

[73] Assignee: Groenenboom Beheer B.V., Biddinghuize, Netherlands

[21] Appl. No.: 377,792

[22] Filed: Jul. 11, 1989

[30] Foreign Application Priority Data

Jul. 12, 1988 [NL] Netherlands ............... 8801766

[51] Int. Cl.⁵ .................................. C05F 17/02
[52] U.S. Cl. ................................. 435/316; 71/12
[58] Field of Search .......... 422/184, 198, 235; 71/12; 435/316

[56] References Cited

U.S. PATENT DOCUMENTS

| | | |
|---|---|---|
| 2,067,627 | 1/1937 | Fenske et al. |
| 3,716,339 | 2/1973 | Shigaki et al. ............ 422/184 |
| 3,770,385 | 11/1973 | Grey et al. ............ 422/184 |
| 4,483,704 | 11/1984 | Easter, II ............ 422/184 |
| 5,028,400 | 7/1991 | Harandi et al. ............ 422/235 |

FOREIGN PATENT DOCUMENTS

| | | |
|---|---|---|
| 0085757 | 8/1983 | European Pat. Off. |
| 87049716 | 9/1987 | Fed. Rep. of Germany |
| 3614056 | 10/1987 | Fed. Rep. of Germany |
| 645333 | 9/1984 | Switzerland |

Primary Examiner—Timothy M. McMahon
Attorney, Agent, or Firm—Young & Thompson

[57] ABSTRACT

In the procedure for producing compost from manure by means of fermentation, in which an oxygen-containing gas and also a gaseous and/or vaporous phase originating from the manure is passed through the manure, the temperature of the manure rises. In order to avoid the temperature rising too high, the gaseous and/or vaporous phase is subjected to cooling outside of the manure to form an ammonia-containing aqueous phase and a residual gas phase. Furthermore, the ammonia is evaporated from the aqueous phase and supplied to the manure along with the residual gas phase. In this way, the ammonia which was hitherto lost in the atmosphere can also be converted into nitrates in the manure, resulting in a higher quality for the manure. Furthermore, less ammonia is discharged in the environment, resulting in less acidification.

3 Claims, 1 Drawing Sheet

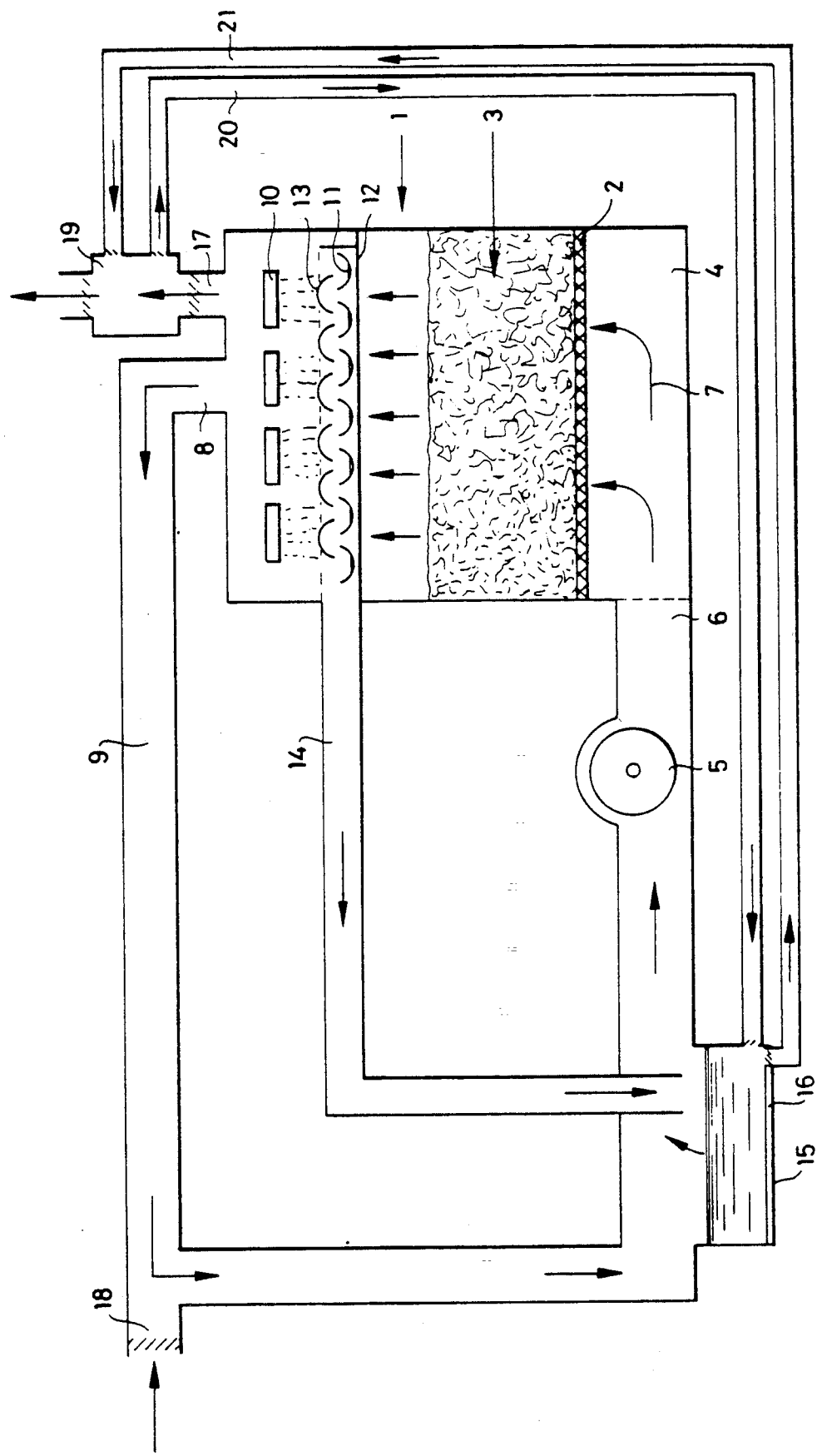

APPARATUS FOR PREPARING COMPOST FROM MANURE BY FERMENTATION

BACKGROUND OF THE INVENTION

The present invention relates to an apparatus for producing compost from manure by means of fermentation, in which an oxygen-containing gas and also a gaseous and/or vaporous phase originating from the manure is passed through the manure. Such a procedure is known. In it micro-organisms contained in the manure produce, inter alia, ammonia, part of which is converted directly into nitrates and part is entrained with the said phase from the manure. As a result of passing said phase through the manure, a part of the entrained ammonia is again converted into nitrates in the manure, with the result that this part of the ammonia is also advantageously used.

As a result of the processes occurring in the manure, the temperature of the latter gradually increases. For the fermentation process to proceed correctly, the temperature must, however, be kept within certain limits. For this purpose, an oxygen-containing gas such as air is supplied in a known manner to the manure in order to cool the latter and keep it within a required temperature range. As a consequence of supplying this additional volume of air, in order to avoid pressure build up, a corresponding volume of the gaseous and/or vaporous phase has to be discharged into the atmosphere. This means that a part of the ammonia contained therein is lost and can therefore not be advantageously used for the production of nitrates, as a result of which the quality of the compost obtained is lower than if all the ammonia were converted into nitrates. A further disadvantage is that this part of the ammonia is returned to the environment.

SUMMARY OF THE INVENTION

The object of the invention is therefore to provide an apparatus for practicing a procedure of the type mentioned in the introduction which lacks these disadvantages. This object is achieved in that the gaseous and/or vaporous phase is subjected to cooling outside of the manure to form an ammonia-containing aqueous phase and a residual gas phase. The temperature of the manure can then be kept within the required range by regulating the cooling of the gaseous and/or vaporous phase in an appropriate manner. According to the invention it is then no longer necessary to supply an oxygen-containing gas such as outside air to the manure in connection with cooling; only enough outside air has to be supplied as is necessary for the oxygen needed in the processes occurring in the manure. This means that the quantity of outside air supplied to the manure, and consequently, also of the gaseous and/or vaporous phase discharged from the manure can be appreciably reduced. It follows from this that appreciably less ammonia is concomitantly discharged into the environment. This procedure offers considerable advantages, especially in the light of the ever increasing manure surpluses of recent years which give rise to increasingly intense acidification of the environment, for example in the form of acid rain.

The ammonia deposited from the gaseous and/or vaporous phase may further be used advantageously in that the ammonia is evaporated from the aqueous phase and supplied to the manure along with the residual gas phase. The advantage of this is that the ammonia which was lost by the known procedure can then also be converted into nitrates in the manure.

As already stated, a part of the gaseous phase also has to be discharged as a consequence of supplying the oxygen needed. Although this is a fraction of the quantity which has to be discharged into the atmosphere by the known procedure, a further improvement can also be obtained in this case in that the residual gas phase is washed with the ammonia-containing aqueous phase and the washed residual gas phase is discharged into the atmosphere. This residual washed gas phase then contains so little ammonia that it gives rise to virtually no environmental problems.

The invention can be used for treating manure having the most diverse compositions. It may be waste of organic origin, for example animal or human waste, which may, however, also contain inorganic material. Furthermore, the manure may contain constituents which originate from industrial processes such as the waste obtained in producing beer or wine and the like.

To carry out the known procedure an apparatus is known which comprises a manure-receiving chamber having discharge means for a gaseous and/or vaporous phase discharged from the manure and having inlet means for supplying an oxygen-containing gas to the manure, the inlet and discharge means being connected to one another and forming a circulation loop with the chamber. In connection with carrying out the procedure according to the invention, this apparatus comprises, in addition, a cooling apparatus and also a collection apparatus for collecting an aqueous phase separated by the cooling of the gaseous and/or vaporous phase, the gas phase remaining after the cooling being passed through the circulation loop.

Preferably provision is made at the same time that the cooling apparatus is situated at the top in the chamber and that the collection apparatus comprises a row of troughs situated underneath and arranged in parallel at a distance from each other, the free spaces between the troughs each being covered by a cap whose longitudinal edges are situated above two adjacent troughs in a manner such that the aqueous phase can be collected in the troughs.

The ammonia bound in the aqueous phase then has to be returned to the manure. This can be achieved in that the collection apparatus is connected to a reservoir for the aqueous phase, which reservoir is provided with a heating apparatus for separating the ammonia by heating the aqueous phase and which is in communication with the inlet part of the circulation loop for entraining the ammonia with the residual gas phase to be supplied to the manure. In this embodiment, there are two separate circuits, namely one for the separated aqueous phase and another for the residual gas phase obtained after separation of the aqueous phase. The first circuit is formed by the manure chamber, the collection apparatus, the reservoir connected thereto and the inlet part of the circulation loop, while the second circuit comprises the circulation loop already mentioned.

Finally, the apparatus may be so embodied that it has a discharge for the discharged part of the residual gas phase, which discharge is provided with a washing system which is connected in circuit with the reservoir. As a result of this, the ammonia contained in the part of the residual gas phase which is discharged into the environment can also be recovered. As already stated, the ammonia can then be evaporated from the reservoir and returned to the manure.

In this last embodiment, there are therefore three separate circuits, namely the two already mentioned above and the third mentioned last comprising the reservoir and the washing system with the connecting pipes.

The invention will be explained in more detail below with reference to an exemplary embodiment.

BRIEF DESCRIPTION OF THE DRAWING

The FIGURE shows a diagrammatic reproduction of the apparatus according to the invention.

DETAILED DESCRIPTION OF THE INVENTION

The chamber indicated by 1 contains a grate 2 on which the manure 3 to be fermented is placed. Beneath the grate there is a chamber 4 to which oxygen-containing gas 7, for example air, is supplied by means of a fan 5 and inlet pipe 6. At the top of the chamber 1 is a discharge pipe 8 from which the gases originating from the manure 3 are discharged. Via the pipe 9 these gases are returned to fan 5, after which they are again passed through the manure 3. Inlet pipe 6, chamber 1, discharge pipe 8 and pipe 9 form the circulation loop or the second circuit. At the top in the chamber 1 there is a cooling apparatus 10 of any known type. Underneath there is a collection apparatus 11 for the aqueous phase which condenses on the cooling apparatus 10. This collection apparatus 11 comprises, for example, a row of troughs 12 which are partially covered by caps 13 in a manner such that the aqueous phase dripping from the cooling apparatus is guided into the troughs 12 without being able to fall onto the manure. The troughs 12 are connected to a discharge pipe 14 which discharges the aqueous phase into the reservoir 15.

During operation, the fan 5 forces the oxygen-containing gas through the manure 3, in which process the temperature of the gas rises as a consequence of the heat generated by the fermentation process. In addition, its humidity increases with the result that the gaseous phase emerging from the manure 3 has a degree of humidity of 100%. The oxygen-containing gas 7 may, for example, have a temperature of 44° C. and a high relative humidity, the manure may have a temperature of 48° C., while the gaseous phase emerging from the manure may have a temperature of 49° C. The cooling apparatus may be so adjusted that the gaseous phase is cooled to 42° C.

The aqueous phase discharged via the discharge pipe 14 is fed into the reservoir 15. The heating apparatus 16 heats the contents of the reservoir to, for example, 60° C., as a result of which the ammonia escapes. The pipe 9 is then connected to the reservoir 15 in a manner such that the gaseous phase flowing through the pipe 9 passes over the surface of the liquid and consequently entrains the escaped ammonia into the chamber 1. This process is continued for just long enough for the ammonia to be completely converted and a compost of the suitable quality is obtained. At the same time, the ammonia is converted through the action of micro-organisms into water and nitrates.

At 17, the discharge is shown for discharging a part of the residual gas phase. This discharge quantity is only a fraction of the total quantity of circulating as. Nevertheless, a washing system 19 is provided on the discharge 17 in order to bind the largest part of the ammonia discharged in this case with the residual gas phase to the wash water. The wash water is supplied from reservoir 15 via inlet pipe 21 to the washing system 19 and is returned from that point to the reservoir 15 via the return pipe 20. The aqueous phase is circulated by means of pumping means which are not shown. In addition, a gas inlet is also shown at 18 by means of which additional outside air can be admitted, if necessary, into the circulation loop.

Finally it is further stated that the circuits are provided in a known manner with measuring apparatuses for temperature, relative humidity and ammonia concentration, and the data can be supplied therefrom to a process computer. This process computer is programmed in such a manner that it is able to control, in a suitable manner, the fan 5, the cooling apparatus 10 and the heating apparatus 16 in order to maintain the required process parameters.

I claim:

1. In an apparatus for preparing compost from manure by fermentation, comprising a manure-receiving chamber having discharge means for gaseous phase discharged from the manure and having inlet means for supplying an oxygen-containing gas to the manure, the inlet and discharge means being fluidly connected to one another and forming a circulation loop with the chamber, said circulation loop having an inlet part; the improvement which comprises a cooling apparatus for cooling the gaseous phase and thereby form an aqueous phase and a residual gas phase, and a collection apparatus for collecting said aqueous phase, and a collection apparatus for collecting said aqueous phase separated by the cooling of the gaseous phase, the residual gas phase remaining after cooling being passed through said circulation loop, said collecting apparatus being fluidly connected to a reservoir for holding the aqueous phase, said reservoir being provided with heating means for separating ammonia by heating the aqueous phase, and being in communication with the inlet part of the circulation loop for introducing thus-separated ammonia into the residual gas phase to be supplied to the manure.

2. Apparatus according to claim 1, further comprising a discharge for discharged residual gas phase, which discharge is provided with a washing system which is fluidly connected n circuit with the reservoir.

3. Apparatus according to claim 1, wherein the cooling apparatus is situated at the top in the chamber and in that the collection apparatus comprises a row of troughs situated underneath said cooling apparatus, and said row of troughs being arranged in parallel at a distance from one another, free spaces between the troughs each being covered by a cap whose longitudinal edges are situated above two adjacent troughs in a manner such that the aqueous phase can be collected in the troughs.

* * * * *